(12) United States Patent
Solomon et al.

(10) Patent No.: US 8,250,398 B2
(45) Date of Patent: Aug. 21, 2012

(54) EVENT TIME MANAGEMENT IN AN ELECTRIC VEHICLE CHARGING STATION WITHOUT A BATTERY-BACKED REAL TIME CLOCK

(75) Inventors: James Solomon, Saratoga, CA (US); Hongfei Cheng, Sunnyvale, CA (US)

(73) Assignee: Coulomb Technologies, Inc., Campbell, CA (US)

( * ) Notice: Subject to any disclaimer, the term of this patent is extended or adjusted under 35 U.S.C. 154(b) by 364 days.

(21) Appl. No.: 12/709,361

(22) Filed: Feb. 19, 2010

(65) Prior Publication Data

US 2011/0208953 A1    Aug. 25, 2011

(51) Int. Cl.
*G06F 1/00* (2006.01)
*G06F 1/12* (2006.01)
*G06F 1/14* (2006.01)
(52) U.S. Cl. ........... 713/400; 713/500; 713/502; 368/52
(58) Field of Classification Search .................. 713/400, 713/500, 502; 368/52
See application file for complete search history.

(56) References Cited

U.S. PATENT DOCUMENTS

| | | | |
|---|---|---|---|
| 6,295,541 B1 * | 9/2001 | Bodnar et al. | 1/1 |
| 6,338,112 B1 * | 1/2002 | Wipfel et al. | 710/269 |
| 6,401,104 B1 * | 6/2002 | LaRue et al. | 1/1 |
| 7,426,573 B2 * | 9/2008 | Wells et al. | 709/238 |
| 2009/0164751 A1 * | 6/2009 | Harikumar et al. | 712/1 |

* cited by examiner

*Primary Examiner* — Mark Connolly
(74) *Attorney, Agent, or Firm* — Blakely, Sokoloff, Taylor & Zafman LLP

(57) ABSTRACT

An electric vehicle charging station, which does not include a battery-backed Real Time Clock, is in a charging station network managed by a charging station network server. Upon booting, the charging station requests actual real time from a remote source. While the charging station has not received the actual real time, it records the time of charging station specific events in a local system time format that resets when the charging station loses power. The charging station maintains the events recorded in their local system time until actual time is received. When actual real time is received, the charging station synchronizes its local system clock with the actual real time and converts the time of each event into real time format. When actual time is received, the charging station converts the time of each event into real time format. After the time of the events are converted to real time format, they are communicated to the charging station network server for further processing. After synchronizing its local clock with actual real time, the charging station records the time of any subsequent events in actual real time.

22 Claims, 8 Drawing Sheets

FIG. 5A

| EPOCH 510 | EVENT 515 | LOCAL SYSTEM TIME 520 | REAL TIME FORMAT 525 |
|---|---|---|---|
| 1 | BOOT-UP | 0:00:00 | -- |
| 1 | START SESSION | 0:01:00 | -- |
| 1 | END SESSION | 0:02:00 | -- |
| 2 | BOOT-UP | 0:00:00 | -- |
| 2 | START SESSION | 0:01:00 | -- |
| 2 | END SESSION | 0:02:00 | -- |
| 3 | BOOT-UP | 0:00:00 | -- |
| 3 | START SESSION | 0:01:00 | -- |
| 3 | END SESSION | 0:02:00 | -- |
| 3 | REAL TIME RECEIVED | 0:04:00 | 10/1/09 3:18:39 |

EVENT STRUCTURE 250

FIG. 5B

| EPOCH 510 | EVENT 515 | LOCAL SYSTEM TIME 520 | REAL TIME FORMAT 525 |
|---|---|---|---|
| 1 | BOOT-UP | 0:00:00 | 10/1/09 2:44:39 |
| 1 | START SESSION | 0:01:00 | 10/1/09 2:45:39 |
| 1 | END SESSION | 0:02:00 | 10/1/09 2:46:39 |
| 2 | BOOT-UP | 0:00:00 | 10/1/09 2:54:39 |
| 2 | START SESSION | 0:01:00 | 10/1/09 2:55:39 |
| 2 | END SESSION | 0:02:00 | 10/1/09 2:56:39 |
| 3 | BOOT-UP | 0:00:00 | 10/1/09 3:14:39 |
| 3 | START SESSION | 0:01:00 | 10/1/09 3:15:39 |
| 3 | END SESSION | 0:02:00 | 10/1/09 3:16:39 |
| 3 | REAL TIME RECEIVED | 0:04:00 | 10/1/09 3:18:39 |

EVENT STRUCTURE 250

FIG. 5C

| EPOCH 550 | LENGTH 560 |
|---|---|
| 1 | 0:10:00 |
| 2 | 0:20:00 |

EPOCH LENGTH STRUCTURE 245

FIG. 7A

EVENT STRUCTURE 250

| EPOCH 710 | EVENT 715 | LOCALLY EST. REAL TIME 720 | UPDATED EST. REAL TIME 725 |
|---|---|---|---|
| 1 | BOOT-UP | 0:00:00 | - |
| 1 | START SESSION | 0:01:00 | - |
| 1 | END SESSION | 0:02:00 | - |
| 2 | BOOT-UP | 0:10:00 | - |
| 2 | START SESSION | 0:11:00 | - |
| 2 | END SESSION | 0:12:00 | - |
| 3 | BOOT-UP | 0:30:00 | - |
| 3 | START SESSION | 0:31:00 | - |
| 3 | END SESSION | 0:32:00 | - |
| 3 | REAL TIME RECEIVED | 0:34:00 | 10/1/09 3:18:39 |
| 4 | BOOT-UP | 10/1/09 3:29:39 | - |
| 4 | START SESSION | 10/1/09 3:37:39 | - |
| 4 | END SESSION | 10/1/09 3:45:39 | - |
| 4 | REAL TIME RECEIVED | 10/1/09 3:50:00 | 10/1/09 5:50:00 |

FIG. 7B

EVENT STRUCTURE 250

| EPOCH 710 | EVENT 715 | LOCAL EST. REAL TIME 720 | UPDATED EST. REAL TIME 725 |
|---|---|---|---|
| 1 | BOOT-UP | 0:00:00 | 10/1/09 2:44:39 |
| 1 | START SESSION | 0:01:00 | 10/1/09 2:45:39 |
| 1 | END SESSION | 0:02:00 | 10/1/09 2:46:39 |
| 2 | BOOT-UP | 0:10:00 | 10/1/09 2:54:39 |
| 2 | START SESSION | 0:11:00 | 10/1/09 2:55:39 |
| 2 | END SESSION | 0:12:00 | 10/1/09 2:56:39 |
| 3 | BOOT-UP | 0:30:00 | 10/1/09 3:14:39 |
| 3 | START SESSION | 0:31:00 | 10/1/09 3:15:39 |
| 3 | END SESSION | 0:32:00 | 10/1/09 3:16:39 |
| 3 | REAL TIME RECEIVED | 0:34:00 | 10/1/09 3:18:39 |
| 4 | BOOT-UP | 10/1/09 3:29:39 | 10/1/09 5:29:39 |
| 4 | START SESSION | 10/1/09 3:37:39 | 10/1/09 5:37:39 |
| 4 | END SESSION | 10/1/09 3:45:39 | 10/1/09 5:45:39 |
| 4 | REAL TIME RECEIVED | 10/1/09 3:50:00 | 10/1/09 5:50:00 |

FIG. 7C

EPOCH LENGTH STRUCTURE 245

| EPOCH 750 | LENGTH 760 |
|---|---|
| 1 | 0:10:00 |
| 2 | 0:20:00 |
| 3 | 0:15:00 |

EVENT TIME MANAGEMENT IN AN ELECTRIC VEHICLE CHARGING STATION WITHOUT A BATTERY-BACKED REAL TIME CLOCK

BACKGROUND

1. Field

Embodiments of the invention relate to the field of electric vehicle charging stations; and more specifically, to event time management in an electric vehicle charging station without a battery-backed Real Time Clock.

2. Background

Electric vehicle charging stations (hereinafter "charging stations") are used to charge electric vehicles and/or plug-in hybrid electric vehicles (hereinafter "electric vehicles"). The charging stations may be networked with a charging station network server that provides services for the charging stations including, among other things, authentication, usage monitoring, billing, and real time control for the charging stations. The time of certain events of the charging station (e.g., charging session start events, charging session stop events, charging station boot-up events, etc.) are used by the server when providing the services. Some charging stations may not have a battery-backed Real Time Clock. As such, if those charging stations reboot or lose power, their local system clocks will reset.

BRIEF DESCRIPTION OF THE DRAWINGS

The invention may best be understood by referring to the following description and accompanying drawings that are used to illustrate embodiments of the invention. In the drawings:

FIGS. 5A-5B illustrate an exemplary charging station event structure according to one embodiment of the invention;

FIG. 5C illustrates an exemplary epoch length structure according to one embodiment of the invention;

FIGS. 7A-7C illustrate an exemplary charging station event structure and epoch length structure used in some embodiments of the invention.

DETAILED DESCRIPTION

Figure 1:
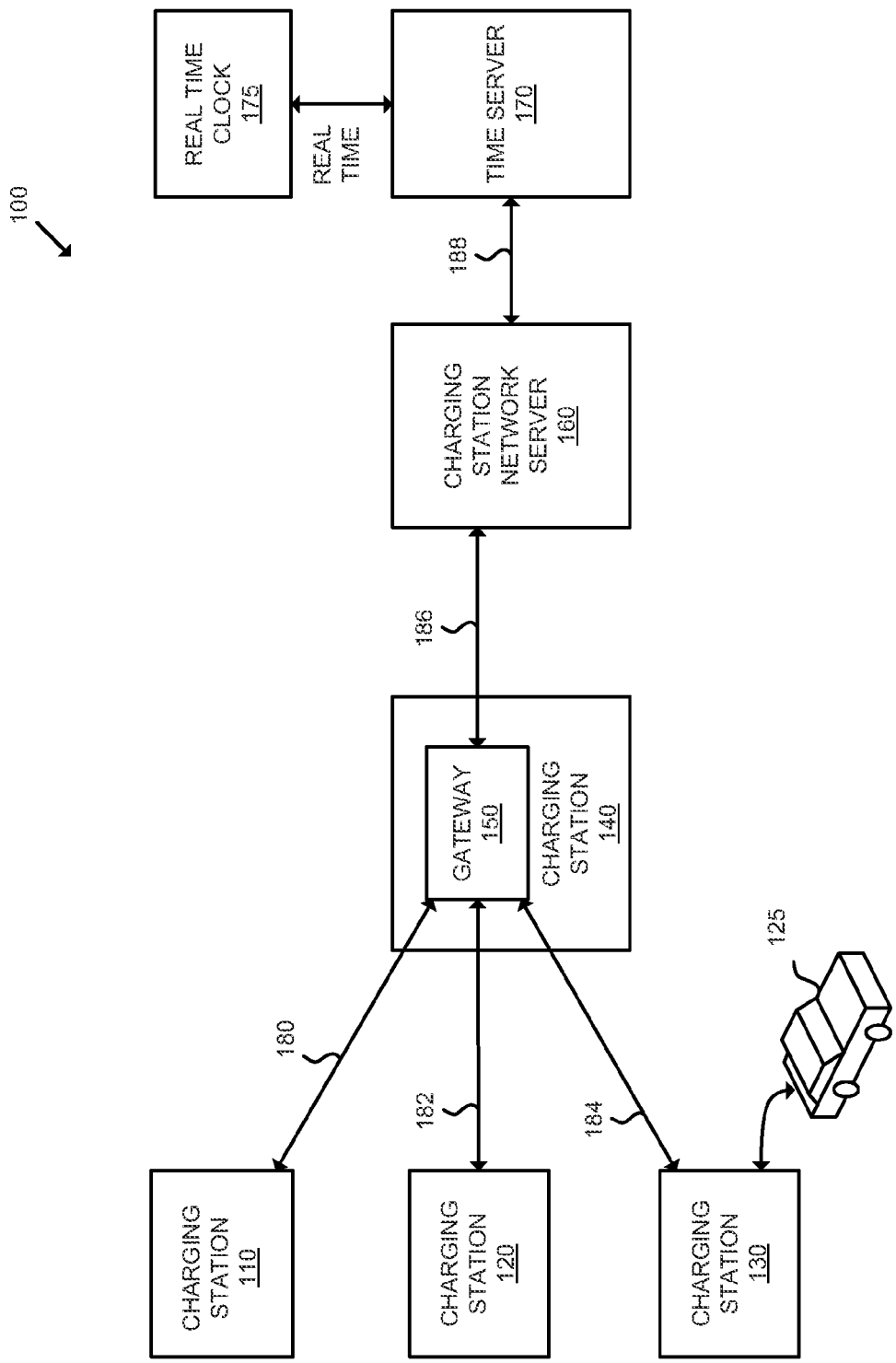
FIG. 1 illustrates an exemplary charging station network according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

In one embodiment, an electric vehicle charging station, which does not include a battery-backed Real Time Clock, is in a charging station network managed by a charging station network server. Upon booting, the electric vehicle charging station requests actual real time from a remote source (e.g., the charging station network server). While the charging station has not received the actual real time, it records the time of charging station specific events in a local system time format that resets when the charging station loses power. The charging station maintains the events recorded in their local system time until actual real time is received. When actual real time is received, the charging station synchronizes its local system clock with the actual real time and converts the time of each event into real time format. After the time of the events are converted to real time format, they are communicated to the charging station network server for further processing (e.g., accounting). After synchronizing its local clock with actual real time, the charging station records the time of any subsequent events in actual real time.

In another embodiment, the electric vehicle charging station, which does not include a battery-backed Real Time Clock, is in a charging station network managed by a charging station network server. Upon booting, the electric vehicle charging station requests actual real time from a remote source (e.g., the charging station network server). While the charging station has not received the actual real time, it records the time of charging station specific events in a locally estimated real time format that is persistent across rebooting of the electric vehicle charging station and is not based on actual real time. The electric vehicle charging station communicates the events recorded in their locally estimated real time format to the charging station network server for further processing (e.g., accounting). When actual real time is received, the charging station records the time of the events in actual real time.

FIG. 1 illustrates an exemplary charging station network 100 according to one embodiment of the invention. The network 100 includes the charging stations 110, 120, 130, and 140. The charging stations 110, 120, 130, and 140 are capable of providing charging services to electric vehicles. In some embodiments, one or more of the charging stations 110, 120, 130, and 140 include a power receptacle to receive charging cords (which may be provided by the vehicle operators) which are connected with the electric vehicle. In other embodiments, one or more of the charging stations 110, 120, 130, and 140 includes an attached charging cord that a vehicle operator plugs into on-board charging circuitry of their electric vehicle. As illustrated in FIG. 1, the electric vehicle 125 is coupled with the charging station 130.

In some embodiments, electric vehicles can also transfer electricity to the local power grid (hereinafter referred to as "vehicle-to-grid" (V2G)). Thus, in some embodiments of the invention, the electric vehicle 125 may consume electricity from the local power grid as well as transfer electricity to the local power grid.

The charging station 140 includes the charging station network gateway (hereinafter "gateway") 150. The gateway 150 relays messages and data between the charging station network server (hereinafter "server") 160 and the charging stations 110, 120, 130, and 140. For example, as will be described in greater detail later herein, the charging stations 110, 120, 130, and 140 communicate events and their times, in real time format, to the server 160 for further processing.

The charging stations 110, 120, and 130 communicate with the gateway 150 over the LAN (Local Area Network) links 180, 182, and 184 respectively (e.g., WPAN (Wireless Personal Area Network) (e.g., Bluetooth, ZigBee, etc.), or other LAN links (e.g., Ethernet, PLC (Power Line Communication), WLAN, etc.)). The gateway 150 exchanges messages and data with the server 160 over the WAN link 186 (e.g., Cellular (e.g., CDMA, GPRS, etc.), Plain Old Telephone Service, leased line, Wi-Fi, WiMAX, etc.). As illustrated in FIG. 1 the gateway 150 is included in the charging station 140, however in other embodiments the gateway 150 is a separate device. In other embodiments the charging stations 110, 120, 130, and 140 communicate with the charging station network server 160 without a gateway device.

The network 100 also includes the time server 170. According to one embodiment of the invention, the time server 170 is a public NTP (Network Time Protocol) time server or a SNTP (Simple Network Time Protocol) server. The time server 170 is coupled with the Real Time Clock 175 (e.g., atomic clock, GPS clock, or other radio clocks). The server 160 is coupled with the time server 170 over the WAN link 188 (e.g., e.g., Cellular (e.g., CDMA, GPRS, etc.), Plain Old Telephone Service, leased line, Wi-Fi, WiMAX, or other Internet link, etc.). In other embodiments, the server 160 is directly coupled with the Real Time Clock 175 or includes a Real Time Clock itself. In some other embodiments, one or more of the charging stations 110, 120, 130, and 140 are directly coupled with the Real Time Clock 175.

The charging stations 110, 120, 130, and 140 do not include a battery-backed Real Time Clock. As such, a charging station requests the current real time sometime after booting up or as part of the boot process. The charging stations 110, 120, 130, and 140 maintain time in a local system format until receiving and synchronizing with the real time. In some embodiments the request and reply is compliant with a standard time synchronization protocol such as Network Time Protocol (NTP) or Simple Network Time Protocol (SNTP).

In one embodiment, the charging station 140 receives the real time from the server 160 over the WAN link 186 and the charging stations 110, 120, and 130 receive the real time from the charging station 140 over the LAN links 180, 182, and 184 respectively. It should be understood that if the WAN link 186 is down or the charging station 140 otherwise fails to receive the real time from the server 160, the charging stations 110, 120, and 130 also will not receive the real time.

The charging stations 110, 120, 130, and 140 may experience multiple charging station specific events during operation. Examples of these events include the following: boot-up events, charging session start events, charging session stop events, ground fault circuit interrupter (GFCI) trip events, overcurrent trip events, charging cord plug-out events, authentication requests, tampering events, and real time receipt events. The charging stations record the time the events occur. Some of the events, and the time of those events, are communicated to the server 160 either directly or indirectly through the gateway 150 for further processing (e.g., each event above with the exception of the real time receipt event). It should be understood that the above events are exemplary and the charging station may experience more or less events.

A boot-up event occurs when a charging station is powered on and is booted. As will be described in greater detail later herein, the time of the boot-up event is sometimes referred to as the time the present epoch started. As used herein, an epoch is a period of time when a charging station is powered and operating. Each charging station maintains an epoch counter which indicates the number of times that charging station has been booted.

A charging session start event occurs when an electric vehicle operator is authenticated to use the charging station and optionally the charging station is energized (e.g., a power receptacle on the charging station is energized). A charging session start event typically serves as the beginning of a charging session. A charging session is a duration of time where charging an electric vehicle is allowed. Typically the server performs accounting, which may include billing or crediting an account of the electric vehicle operator associated with the charging session, based on charging session data (e.g., amount of electricity consumed or transferred during that charging session, the total amount of time of the charging session, etc.).

A charging session stop event occurs when the charging session is terminated. For example, charging sessions may be terminated due to a charging limit being reached (e.g., some amount of dollars worth of electricity has been consumed, the battery is fully charged, etc), by request of the vehicle operator, by request of an administrator or service personnel of the charging station, due to a loss of power, etc.

A GFCI trip event occurs when a GFCI device, included in the charging station, detects a ground fault condition. It should be understood that some charging stations may not include a GFCI device and thus may not be capable of generating GFCI trip events.

An overcurrent trip event occurs when the amount of electric current flowing through the charging station exceeds an overcurrent threshold (which may be configurable in some embodiments). A charging cord plug-out event occurs when the charging station detects that the charging connection between the electric vehicle and the charging station has unexpectedly disconnected. For example, the charging cord of the electric vehicle may have been unexpectedly removed from the on-board circuitry of the electric vehicle, been severed or damaged, etc. A real time received event occurs when actual real time is received (e.g., from the gateway 150 or the server 160).

An authentication request event occurs when a user requests a charging session of the charging station. For example, in some embodiments, a user (e.g., an electric vehicle operator) requests a charging session by waving/swiping an RFID enabled device that is embedded with RFID tag(s) associated with that user near an RFID reader of the charging station (or a remote payment station coupled with the charging station). The charging station (or remote payment station) then transmits an authentication request on behalf of that user to the server 160 (either directly or indirectly through the gateway 150) which then performs an authentication process for that user (e.g., determining whether the user is allowed to use the charging station). In some embodiments, if the link to the server 160 is down (and thus the server 160 cannot receive the authentication request), the charging station allows the user to charge their vehicle as if the user is authenticated.

A tampering event occurs when an entity attempts to alter, damage, or misuses the charging station. For example, a tampering event may be generated responsive to someone prying open a charging station door, which locks the charging cord to prevent theft, vandalism, etc. In some embodiments, one or more sensors on the door, which sense the position of the door (e.g., whether the door is closed), are used to determine whether the door is being opened in an unauthorized manner (e.g., the door is being opened while there is an active charging session by an unauthorized entity). As another example, a tampering event may be generated in response to someone attempting to alter or change a meter within the charging station.

Figure 2:
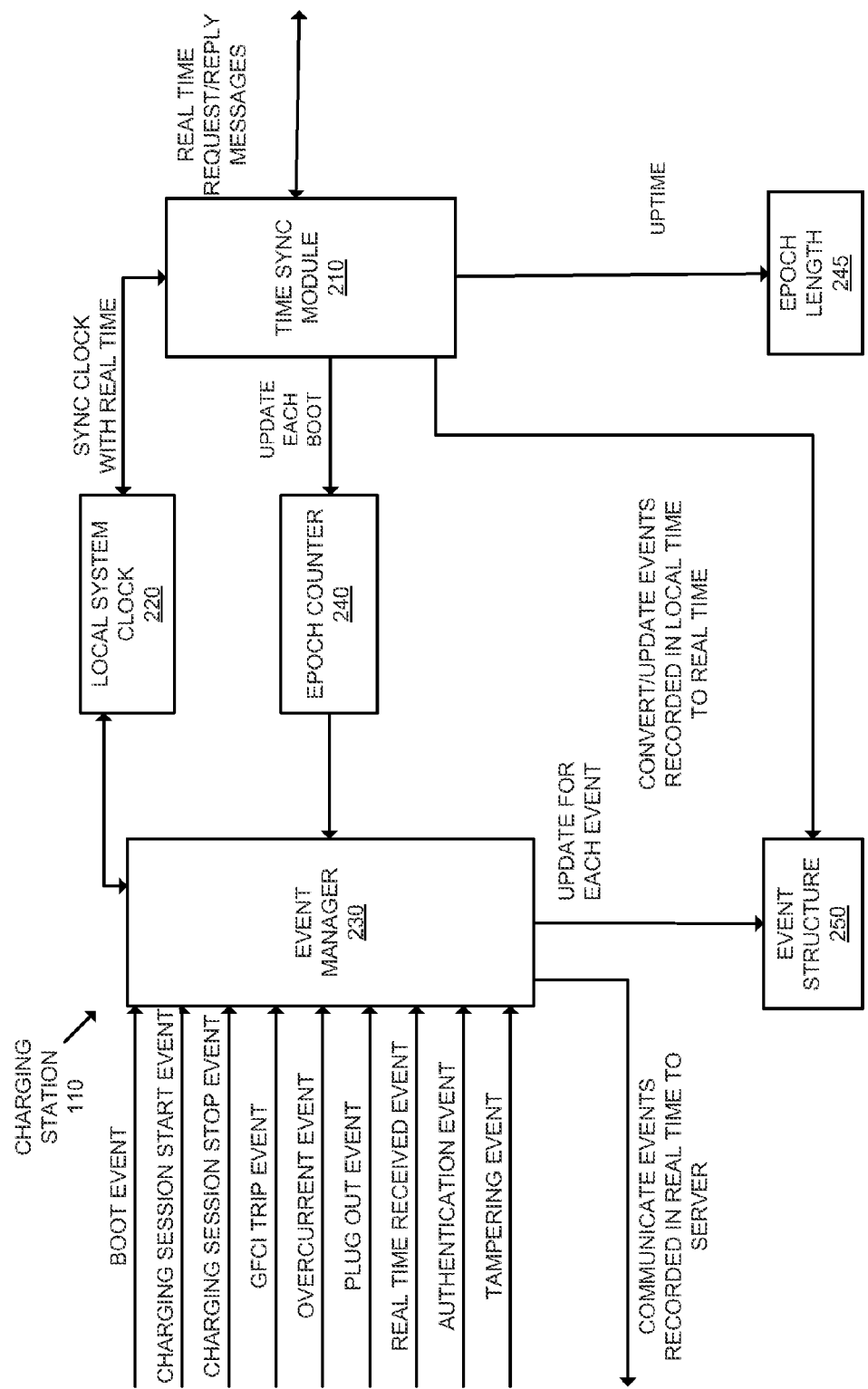
FIG. 2 is a block diagram illustrating an exemplary charging station that performs time synchronization with a Real Time Clock according to one embodiment of the invention.

FIG. 2 is a block diagram illustrating an exemplary charging station that performs time synchronization with a Real Time Clock according to one embodiment of the invention. The time synchronization module 210 processes request and reply messages for the present real time. According to one embodiment, the time synchronization module 210 requests the present real time responsive to the charging station 110 booting up. After receiving the present real time, the time synchronization module 210 synchronizes the local system clock 220 to the real time. In one embodiment, the local system clock 220 is a library that is used by the time synchronization module 210 and the event manager 230. Since the local system clock 220 is not backed up with a battery, it will restart once power is lost to the charging station 110.

The time synchronization module 210 also updates the epoch counter 240 (e.g., an integer) each time the charging station 110 is booted. The value of the epoch counter 240 indicates the number of times the charging station 210 has been booted. For example, a value of three for the epoch counter 240 indicates that the charging station has been booted three times. The epoch counter 240 is stored in persistent memory and does not get reset.

As will be described later herein, in some embodiments events detected in a given epoch are recorded in local system time format for that epoch until actual real time is received and synchronized with the local system clock 220. Local system time format is a format that resets when the charging station is booted. For example, the time of the boot-up event as recorded in local system time format may be the same for multiple epochs.

In other embodiments, events detected in a given epoch are recorded in a locally estimated real time format that is not based on actual real time until actual real time is received. In contrast to local system time format, locally estimated real time format is persistent and survives across reboots of the charging station and is unique per event. For example, the times of events in one epoch as recorded in locally estimated real time format will be different from the times of events in a different epoch as recorded in locally estimated real time format.

The time synchronization module 210 also records the length of the epoch in the epoch length structure 245. For example, the time synchronization module 210 periodically writes the uptime of the charging station 110 (the amount of time since the charging station 110 has been booted) for the current epoch to the epoch length structure 245. The uptime may be updated at different intervals in different embodiments (e.g., seconds, minutes, etc.). Each different epoch (as indicated by the epoch counter 240) has a separate epoch length. The value of the epoch length serves as an approximate amount of time the charging station 110 operates between boots. It should be understood the accuracy of the recorded epoch length depends on the size of the interval. The epoch length structure 245 is stored in persistent memory and may include an epoch length for multiple epochs.

FIG. 5C illustrates an exemplary epoch length structure 245 according to one embodiment of the invention. As illustrated in FIG. 5C, the epoch length structure 245 includes the epoch field 550 and the length field 560. As will be described later herein, the values in the epoch length structure 245 are used when converting events that were recorded in local system time to real time format after the local system clock 220 is synchronized with the Real Time Clock 175. It should be understood that the epoch length structure 245 as illustrated in FIG. 5C is exemplary and alternative implementations of the epoch length structure 245 may have different, more, or less fields than illustrated in FIG. 5C.

The event manager 230 uses the local system clock 220 to record the time of events (e.g., boot events, charging session start events, charging session stop events, GFCI trip events, overcurrent events, plug out events, real time received events, etc.) for the current epoch in the event structure 250. In some embodiments, when the local system clock 220 is not synchronized with the Real Time Clock 175, the event manager 230 records the time of the events in local system time format for the current epoch. In other embodiments, the event manager 230 records the time of the events in a locally estimated real time format while the local system clock 220 is not synchronized with the Real Time clock 175. When the local system clock 220 is synchronized with the Real Time Clock 175, the time of the events will be recorded in real time format.

In some embodiments, after the actual real time is received and the local system clock 220 is synchronized to real time, the time synchronization module 210 converts the time of each event recorded in local system time format to real time format. This may include converting events from previous epochs than the epoch in which the real time was received. For events recorded in a previous epoch, the conversion from local system time format to real time format takes into account the length of that epoch and optionally an amount of time it takes to boot the charging station. It should be understood that the converted real time values for the events in previous epochs are approximate times. In one embodiment, the real time format is in Coordinated Universal Time (UTC) format.

FIGS. 5A-5B illustrate an exemplary event structure 250 according to one embodiment of the invention. As illustrated in FIGS. 5A-5B, the event structure 250 includes the epoch field 510, the event field 515, the local system time field 520, and the real time format field 525. FIG. 5A illustrates the state of the event structure 250 prior to converting the local system times of the events to the real time format and FIG. 5B illustrates the state of the event structure 250 after converting the local system times of the events to the real time format.

Figure 3:
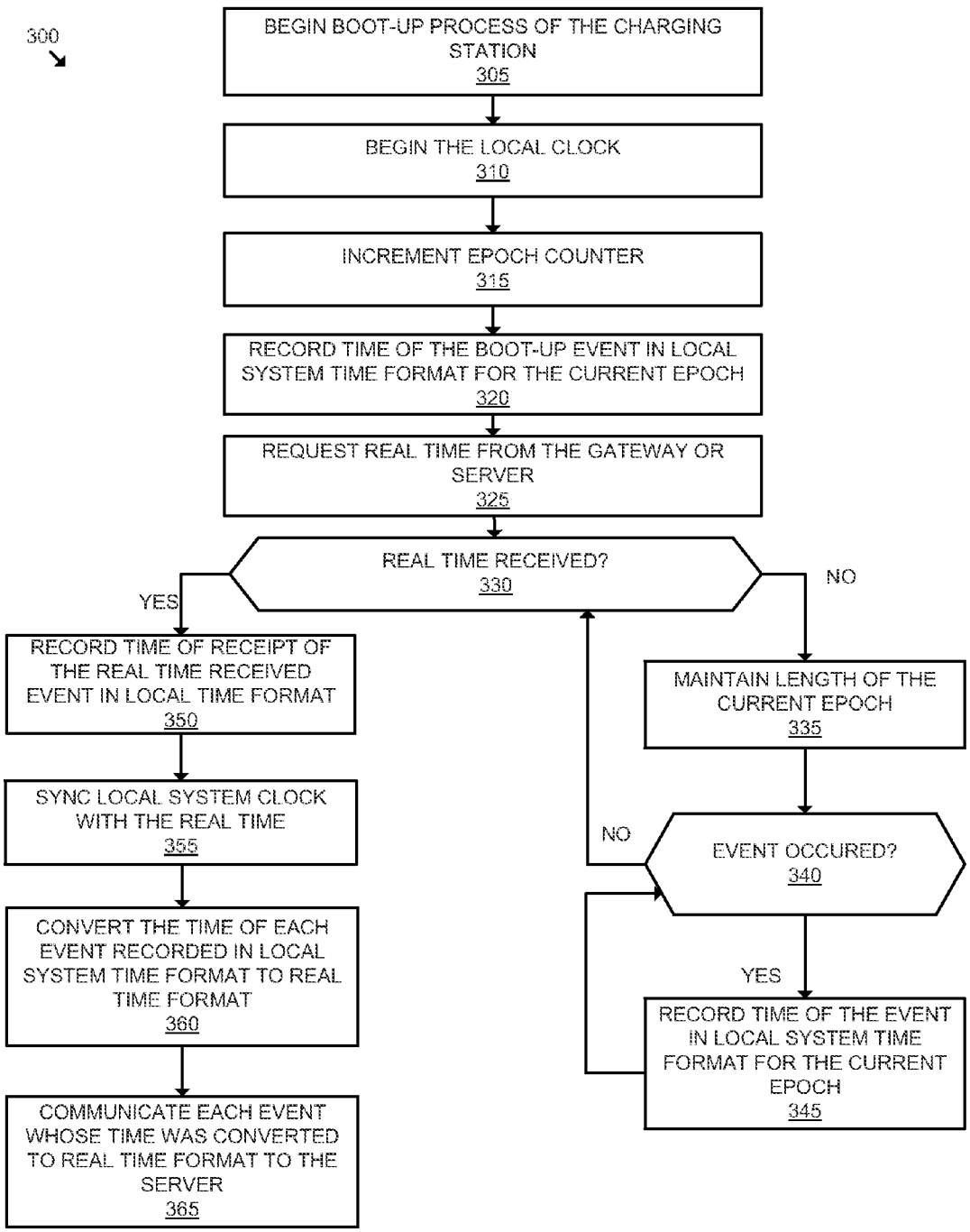
FIG. 3 is a flow diagram illustrating exemplary operations for performing event time management in a charging station that does not include a battery-backed Real Time Clock according to one embodiment of the invention.

FIG. 3 is a flow diagram illustrating exemplary operations 300 for performing time synchronization in a charging station that does not include a battery-backed Real Time Clock where events are initially recorded in local system time format according to one embodiment of the invention. The operations of FIG. 3 will be described with reference to the exemplary embodiment of FIG. 2. However, it should be understood that the operations of FIG. 3 can be performed by embodiments of the invention other than those discussed with reference to FIG. 2, and the embodiments discussed with reference to FIG. 2 can perform operations different than those discussed with reference to FIG. 3.

The operations 300 begin at block 305, where the charging station 110 begins a boot-up process. As will be described later herein, the boot-up process generates a boot-up event. Flow then moves to block 310 where the charging station 110 begins the local system clock 220. Since the charging station 110 does not include a battery backed Real Time Clock, the local system clock 220 will not be synchronized with real time and will begin at zero. Flow moves from block 310 to block 315 where the time synchronization module 210 increments the epoch counter 240. As previously described, the present value of the epoch counter 240 indicates the present epoch. Flow moves from block 315 to block 320.

At block 320, the event manager 230 uses the local system clock 220 to record the time of the boot-up event in local system time format for the present epoch. It should be understood that the local system time format is not in real time (actual time). Flow then moves to block 325 where the time synchronization module 210 requests real time from the gateway 150 or the server 160. According to an embodiment the request is compatible with NTP or SNTP. Flow moves to block 330, where a determination is made whether the real time has been received. With reference to FIG. 1, the WAN links and the LAN links may be unreliable. Thus it should be understood that the time synchronization module 210 may retransmit the real time request a number of times before determining that real time will not be received. If real time is not received, then flow moves to block 335, otherwise flow moves to block 350.

At block 335, the time synchronization module 210 maintains the length of the current epoch by periodically writing the uptime of the charging station (the amount of elapsed time since booting) in the epoch length structure 245. It should be understood that this value is periodically updated (e.g., once a minute) and its order in the flow of operations of FIG. 3 is exemplary and can be performed in a different order, between other operations, overlapping other operations, etc. Flow then moves to block 340 where a determination is made whether an event (e.g., charging session start event, charging session stop event, GFCI trip event, overcurrent event, plug-out event, authentication event, tampering event, etc.) has occurred. If an event has not occurred, then flow moves back to block 330, otherwise flow moves to block 345 where the event manager 230 records the time of the event in local system time format for the current epoch in the event structure 250. Flow then moves back to block 340.

It should be understood that the real time may be received at any point during the operations described in reference to blocks 335-345. If it does, then the control will flow to block 350.

After real time has been received, at block 350 the event manager 230 records the time of receipt of the real time received event in local system time format for the present epoch in the event structure 250. For example, with reference to FIG. 5A, the real time received event was received during epoch 3 at a local system time of 0:04:00 (thus the real time was received approximately four minutes after the charging station 110 booted). Flow moves from block 350 to block 355.

At block 355, the time synchronization module 210 synchronizes the local system clock 220 with the received real time. After the local system clock 220 is synchronized with the real time (e.g., the Real Time Clock 175), the event manager 230 records the time of events in real time format. Flow moves from block 355 to block 360.

At block 360, the time synchronization module 210 converts the time of each event recorded in local system time format to real time format. This may include converting events that occurred in different epochs than the present epoch. For example, with reference to FIG. 5A, there are three different epochs that have recorded events in the event structure 5A. The charging station may have multiple epochs with events in local system format if the charging station has rebooted before learning the real time (e.g., the charging station has lost power or otherwise has rebooted).

It should be understood that the events in the epoch in which the real time was received (e.g., epoch 3 as illustrated in FIG. 5A) can be converted to real time format precisely and the actual time those events occurred can be determined However, for those events in previous epochs (e.g., epochs 1 and 2 as illustrated in FIG. 5A), the actual real time of those events cannot typically be determined since the charging station typically cannot determine the precise length of time between epochs (e.g., the amount the charging station was not operating between boots). However, working backwards from the present epoch and using the epoch length, the real time of the events in the previous epochs may be estimated.

Figure 4:
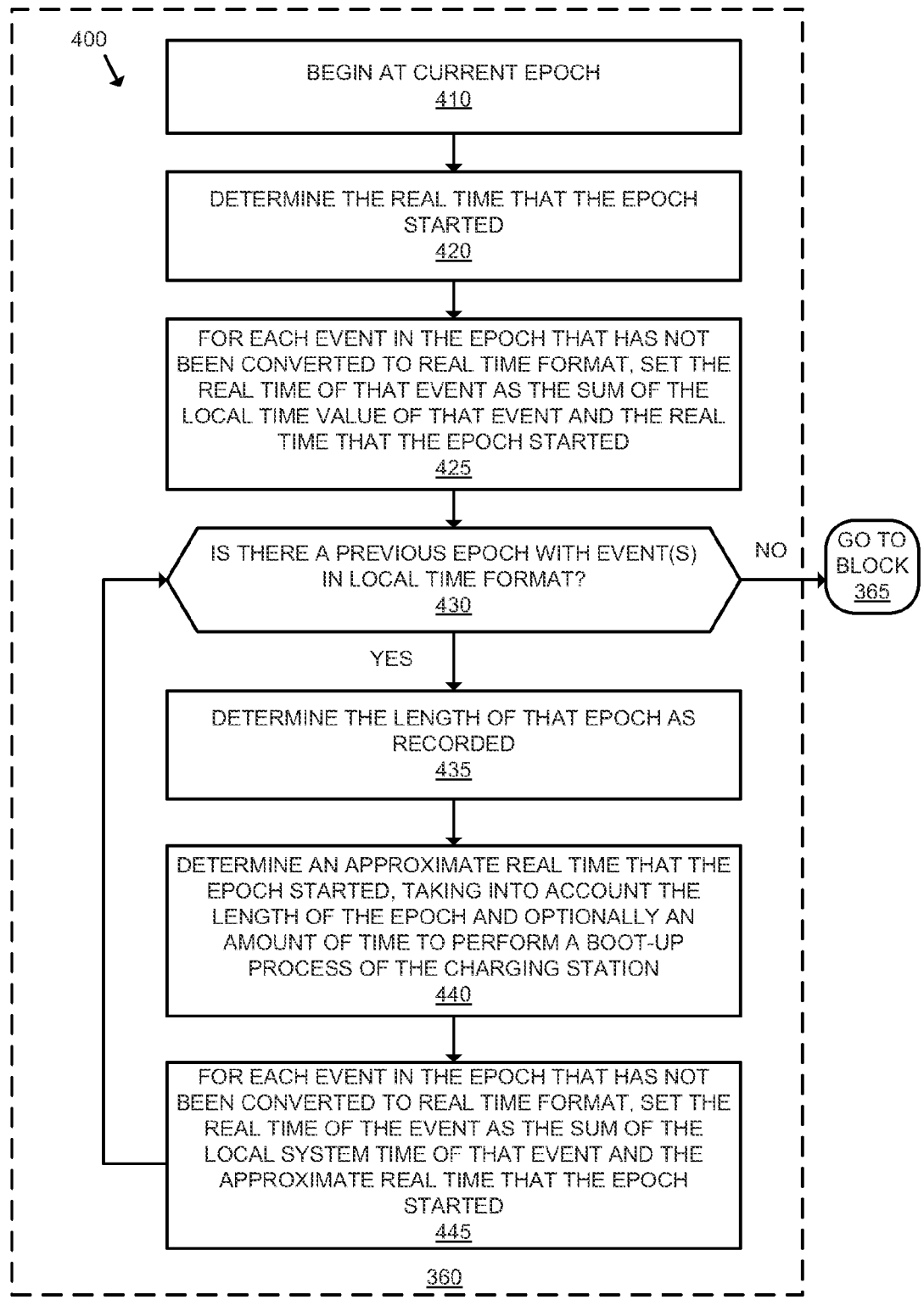
FIG. 4 is a flow diagram illustrating exemplary operations for converting charging station events recorded in local system time to real time according to one embodiment of the invention.

FIG. 4 is a flow diagram illustrating exemplary operations 400 for converting charging station events recorded in local system time to real time format according to one embodiment of the invention. The operations of FIG. 4 will be described with reference to the exemplary embodiment of FIG. 2. However, it should be understood that the operations of FIG. 4 can be performed by embodiments of the invention other than those discussed with reference to FIG. 2, and the embodiments discussed with reference to FIG. 2 can perform operations different than those discussed with reference to FIG. 4. According to one embodiment, the operations of FIG. 4 are performed in reference to block 360 of FIG. 3.

The operations 400 start at block 410, where the time synchronization module 210 begins at the current epoch in which the real time was received. With reference to FIG. 5A, epoch 3 is the current epoch. Flow then moves to block 420, where the time synchronization module determines the real time that the current epoch started. In an embodiment, the time that the current epoch started is equivalent to the time of the boot-up event in real time format. By way of example, the time of the boot-up event in real time format can be determined by subtracting the difference between the local system time of the real time received event (0:04:00 as illustrated in FIG. 5A) and the local system time of the boot-up event of the current epoch (e.g., 0:00:00 as illustrated in FIG. 5A), from the real time received event in real time format (e.g., 10/1/09 3:18:39). Thus with reference to FIGS. 5A-5B, the difference between the local system time of the real time received event and the local system time of the boot-up event is four minutes, which is subtracted from the from the real time received event in real time format (10/01/09 3:18:39), resulting in the time of the boot-up event in real time format (10/01/09 3:14:39). Of course it should be understood that the time of the boot-up event in real time format may be computed differently than the above example. Flow then moves to block 425.

At block 425, for each event in the current epoch that has not been converted to a real time format, the time synchronization module 210 sets the real time of that event as the sum of the local system time value of that event and the real time that the epoch started. For example, with reference to FIGS. 5A-5B, the real time format of the charging session start event in epoch 3 is set as the sum of the local system time of that event (0:01:00) and the time of the boot-up event in real time format (10/1/09 3:14:39), which results in the time 10/1/09 3:15:39. Flow moves from block 425 to block 430.

At block 430, the time synchronization module 210 determines whether there are previous epochs with one or more events in local system time format that are to be converted into real time format. If there are no other epochs, then flow moves to block 365 of FIG. 3, otherwise flow moves to block 435. With reference to FIGS. 5A-5B, the epochs 1 and 2 contain events in local system time format that are to be converted to real time format.

At block 435, the time synchronization module 210 determines the length of the previous epoch as recorded in the epoch length structure 245. For example, as illustrated in FIG. 5C, the length of epoch 2 is 0:20:00. It should be understood that the accuracy of the epoch length in the epoch length structure 245 depends on the interval in which the lengths of the epochs are written to the epoch length structure 245. Flow moves from block 435 to block 440.

At block 440, the time synchronization module 210 determines the approximate real time that the previous epoch started, taking into account the length of the epoch and optionally an amount of time to boot the charging station 110. In an embodiment, the time that the previous epoch started is equivalent to the time of the boot-up event in that epoch in real time format. By way of example, the time of the boot-up event in real time format can be determined by subtracting the length of the epoch from the time that the subsequent epoch started, and optionally subtracting a reboot time value, which is an estimation of the minimum time necessary to boot the charging station 110. By way of example, with reference to epoch 2 illustrated in FIGS. 5A-5C, the approximate real time that epoch 2 started can be determined by subtracting the epoch length of epoch 2 (0:20:00) from the real time format of the boot-up event for epoch 3 (10/1/09 3:14:39), with a result of 10/1/09 2:54:39. The example of the real time format in FIG. 5B does not include the optional time necessary to boot the charging station. Instead of or in addition to the optional reboot time value, the approximate real time can also take into account the average time between epoch length updates. For example, since the epoch length is updated periodically (e.g., every 60 seconds), there is on average a half of epoch length period (e.g., 30 seconds if the period is 60 seconds) that will not be reflected in the stored epoch length. This value may be optionally taken into account to improve the estimate of the approximate real time. Flow moves from block 440 to block 445.

At block 445, for each other event in the previous epoch that has not been converted to real time format, the time synchronization module 210 sets the real time of that event as the sum of the local system time of that event and the approximate real time that the epoch started. For example, with reference to FIGS. 5A-5B, the real time format of the charging session start event in epoch 2 is the sum of the local system time of that event (0:01:00) and the time of the boot-up event in real time format (10/1/09 2:54:39), which results in the time 10/1/09 2:55:39. Flow moves from block 445 back to block 430 where, for example with reference to FIGS. 5A-5C, the time of the events in epoch 1 are converted to real time format.

Referring back to FIG. 3, flow moves from block 360 to block 365. At block 365, each event whose time was converted to real time format is communicated to the server 160. With reference to the charging station 110, it should be understood that these events are communicated to the gateway 150 which then communicates the events to the server 160 for further processing.

After receiving and synchronizing the local system clock 220 with real time, the time of the events are recorded using real time format. Thus for subsequent events occurring on the charging station 110, the time of those events are recorded in real time format.

As described with reference to FIG. 1, the charging station network 100 may be unreliable and the charging stations may retransmit event communications that are unacknowledged. Communicating events to the server 160 along with the estimated real time those events occurred allows the server 160 to unambiguously determine whether the event communication is a retransmission (e.g., the transmitting charging station failed to receive an acknowledgement message) or a new transmission.

For example, communicating events to the server 160 in real time format provides a means by which the server 160 can determine whether a charging session identifier (included in charging session events such as charging session start events and charging session stop events) is associated with an old charging session (e.g., a charging session previously processed for accounting) or a new charging session (e.g., a charging session that has not been processed for accounting). A charging session identifier associated with an old charging session may be an indication that the charging session counter was reset. As examples, a charging session counter may be reset in the following situations: the memory of the charging station is wiped, software is upgraded on the charging station, the memory of the charging station fails, the memory of the charging station is replaced, the charging station is reset to factory defaults, the charging station was accidentally reset, etc. In an embodiment, the server 160 treats a charging session event from a particular charging station as duplicate (belonging to a same charging session) if the real time of that event and the charging session identifier associated with that event are identical to a previously received charging session event from that charging station. Thus by communicating the events along with their real time format, which is persistent across reboots of the charging station, the server 160 can unambiguously determine whether a charging session identifier has been reset.

ANOTHER EMBODIMENT OF THE INVENTION

Having described embodiment(s) of the invention, alternative embodiment(s) will now be described. Like the previous embodiment(s), these alternative embodiment(s) allow for synchronizing charging station events belonging to a charging station with a remote Real Time Clock. However, unlike the previous embodiment(s), these embodiment(s) include the charging station storing events that are recorded in a locally estimated real time format without knowing the actual real time (e.g., prior to receiving the actual real time). As described above, the locally estimated real time format is persistent across reboots of the charging station. The events recorded in the locally estimated real time format can be communicated to the gateway or server (assuming the link between the charging station and the gateway and/or server is operational) without receiving or knowing the actual real time. When the charging station learns the actual real time (e.g., when it receives the real time from the server), the charging station may update its local estimate of time and record events in actual real time.

As described in the previous embodiment(s), the server can determine whether an event communication is new or is a retransmission based on the locally estimated real time format of that event. For example, the server 160 may compare the locally estimated real time of received event communications from the charging station 110 with previously received event communications from the charging station 110. If the value of a locally estimated real time of an event communication matches a time value associated with a previously received event communication, the server 160 treats it as a retransmitted event communication. For example, the server can determine whether a charging session identifier included in an event communication is associated with an old charging session (e.g., a charging session previously processed for accounting) or whether the charging session identifier is associated with a new charging session (e.g., a charging session that has not been processed for accounting).

Thus, regardless whether a time value of an event communications is in a locally estimated real time format (not based on actual real time) or in estimated real time format based on actual real time, the server 160 can unambiguously determine whether the event communication is new or a retransmission. Determining retransmissions as compared to new communication events assists in the server 160 accurately processing the event communications (e.g., preventing double-billing or under-billing of vehicle operators for charging station services, determining during what session an event occurred (e.g., determining that a plug-out event occurred during a particular charging session, etc.), etc.).

Figure 6:
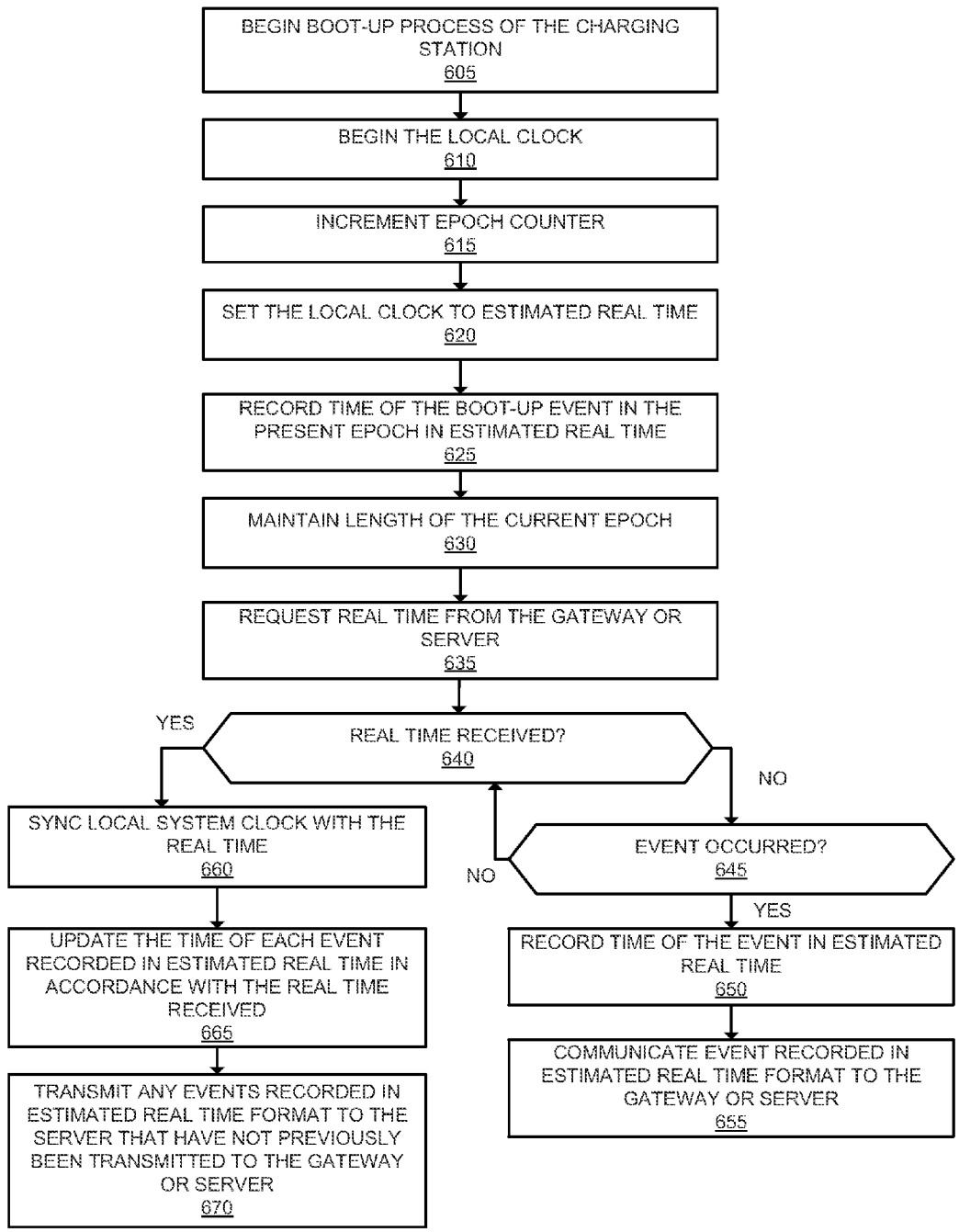
FIG. 6 is a flow diagram illustrating exemplary alternative operations for performing event time management in a charging station that does not include a battery-backed Real Time clock according to one embodiment of the invention.

FIG. 6 is a flow diagram illustrating exemplary alternative operations for performing time synchronization in a charging station that does not include a battery-backed Real Time clock where events are initially recorded in a locally estimated real time not based on actual real time according to one embodiment of the invention. Similar to the operations in FIG. 3, the operations in FIG. 6 will be described with reference to the exemplary embodiment of FIG. 2. However, it should be understood that the operations of FIG. 6 can be performed by embodiments of the invention other than those discussed with reference to FIG. 2, and the embodiments discussed with reference to FIG. 2 can perform operations different than those discussed with reference to FIG. 6.

The operations 600 begin at block 605, where the charging station 110 begins a boot-up process. As described above, the boot-up process generates a boot-up event. Flow then moves to block 610 where the charging station 110 begins the local system clock 220. Since the charging station 110 does not include a battery backed Real Time Clock, the local system clock 220 will not be synchronized with real time and will initially begin at zero. Flow then moves to block 615, where the time synchronization module 210 increments the epoch counter 240. As previously described, the current value of the epoch counter 240 indicates the present epoch. Flow moves from block 615 to block 620.

At block 620, the time synchronization module 210 sets the local system clock to a locally estimated real time value the present epoch started (e.g., the estimated real time value of the boot-up event of the present epoch). In some embodiments, this estimated real time value is the sum of the start of the immediately previous epoch (e.g., the value of the boot-up event of the previous epoch), the length of the immediately previous epoch, and optionally a reboot time value (an estimation of the minimum time necessary to boot the charging station 110). It will be understood that if there is not a previous epoch, the estimated real time value will typically begin at zero. The locally estimated real time may also take into account the average time between epoch length updates. For example, since the epoch length is updated periodically (e.g., every 60 seconds), there is on average a half of epoch length period (e.g., 30 seconds if the period is 60 seconds) that will not be reflected in the stored epoch length. This value may be optionally taken into account to improve the estimate of the approximate real time (e.g., by adding the half of epoch length period).

For example, FIGS. 7A-7C illustrate an exemplary charging station event structure and epoch length structure according to one embodiment of the invention. As previously described, the charging station 110 periodically updates its uptime (the amount of time since it has booted) for the current epoch (known as the epoch length). As illustrated in FIGS. 7A-7B, the event structure 250 includes the epoch field 710, the event field 715, the locally estimated real time field 720, and the updated estimated real time field 725. The epoch length structure 245 includes the epoch field 750 and the epoch length field 760. FIG. 7A illustrates the state of the event structure 250 prior to updating the locally estimated real times of the events and FIG. 7B illustrates the state of the event structure 250 after updating the locally estimated real times of the events.

With reference to FIG. 7A, the boot-up event for epoch 1 is recorded with the locally estimated real time 0:00:00 (thus epoch 1 started at the locally estimated real time of 0:00:00), the boot-up event for epoch 2 is recorded with the locally estimated real time 0:10:00 (thus epoch 2 started at the locally estimated real time of 0:10:00), the boot-up event for epoch 3 is recorded with the locally estimated real time 0:30:00 (thus epoch 3 started at the locally estimated real time of 0:30:00), and the boot-up event for epoch 4 is recorded with the locally estimated real time 10/1/09 3:55:00 (thus epoch 4 started at the locally estimated real time of 10/1/09 3:55:00). In some embodiments, the values of the locally estimated real time field 720 are stored in UTC format.

Flow moves from block 620 to block 625, where the event manager 230 uses the local system clock 220 to record the time of the boot-up event in its locally estimated real time for the present epoch. It should be understood that the locally estimated real time is not the actual real time. The boot-up event is recorded in the charging station event structure 250.

Flow moves from block 625 to block 630, where the time synchronization module 210 maintains the length of the current epoch by periodically writing the uptime of the charging station (the amount of elapsed time since booting) in the epoch length structure 245. It should be understood that this value is periodically updated (e.g., once a minute) and its order in the flow of operations of FIG. 6 is exemplary and can be performed in a different order, between other operations, overlapping other operations, etc. With reference to FIG. 7C, the epoch length of epochs 1, 2, and 3 is 0:10:00, 0:20:00, and 0:15:00 respectively.

Flow moves from block 630 to block 635, where the time where the time synchronization module 210 requests real time from the gateway 150 or the server 160. According to an embodiment, the request is compatible with NTP or SNTP. Flow moves to block 640, where a determination is made whether the real time has been received. It should be understood that in some situations the charging station 110 may be able to communicate with the gateway 150 and the server 160 (e.g., the LAN link 180 and the WAN link 186 are operational) yet not able to receive real time. For example, the time server 170 may not be operational, the time server daemon may have crashed on the charging station network server 160, etc. If real time is not received, then flow moves to block 645, otherwise flow moves to block 660.

Referring to block 645, a determination is made whether an event (e.g., a charging session start event, a charging session stop event, a GFCI trip event, an overcurrent event, a plug-out event, an authentication event, a tampering event, etc.) has occurred. If an event has not occurred, then flow moves back to block 640, otherwise flow moves to block 650 where the event manager 230 records the time of the event in its locally estimated real time for the current epoch in the event structure 250 (e.g., by using the local system clock 220 which has been previously initialized in the locally estimated real time format). Examples of events recorded in their locally estimated real times are illustrated in the event structure 250 of FIG. 7A. It should be understood that since events are recorded in a locally estimated real time format that is based on previous values and the values progressively increase, the values are unique across multiple reboots and multiple epochs (assuming that the previous values in the epochs were not lost due to a hardware failure (e.g., the non-volatile memory storing the event structure 250 crashes or otherwise loses the data) or other failure).

Flow moves from block 650 to block 655, where the event recorded in estimated real time format is communicated to the server 160 either directly or through the gateway 150. A charging session identifier may also be included in the events (e.g., in charging session events such as charging session start events and charging session stop events). It should be understood that this operation assumes that the charging station 110 is capable of communicating with the server 160. Thus unlike the operations in FIG. 3, where the charging station 110 waits to communicate the events until sometime after the events are converted to real time format (after receiving the actual real time from the server 160), the operations described in FIG. 6 allow events to be communicated to the server without being converted or updated based on actual real time received from the server 160. In some embodiments the boot-up event is also communicated to the server 160 in its estimated real time format.

The server 160 can determine whether events communicated from the charging station 110 are new events or are retransmissions. Retransmissions may occur, for example, when the charging station 110 does not receive a corresponding acknowledgement from the server 160. Since the events are recorded in a locally estimated real time that is unique, the server 160 may quickly identify which events are new or are retransmitted events. For example, the server 160 may compare the locally estimated real time of the event with event communications it has already received from the charging station 110. If the value of the locally estimated real time of the event matches a value associated with a previously received event, then it is a retransmission. Determining retransmissions as compared to new events assists in preventing double-billing or under-billing for the charging station services.

Referring back to FIG. 6, after actual real time has been received from the server 160, at block 660 the time synchronization module 210 synchronizes the local system clock 220 with the received real time. After the local system clock 220 is synchronized with the real time (e.g., with the Real Time Clock 175), the event manager 230 records the time of events in actual real time format. Flow moves from block 660 to block 665.

At block 665, the time synchronization module 210 updates the time of each event recorded in its locally estimated real time in accordance with the real time received. This may include updating the time for events that occurred in different epochs than the present epoch. The charging station may have multiple epochs with events recorded in locally estimated real time if the charging station has rebooted before learning the actual real time (e.g., the charging station has lost power or otherwise has rebooted). FIG. 7B illustrates the event structure 250 after the locally estimated real times of the events are updated.

Flow moves from block 665 to block 670, where the charging station 110 communicates any events recorded in estimated real time format to the server 160 (either directly or indirectly via the gateway 150) that have not been previously communicated to the server 160. In some embodiments, the operations described in reference to blocks 660-670 are optional.

The techniques shown in the Figures can be implemented using code and data stored and executed on one or more computing devices (e.g., charging stations, charging station network servers, etc.). Such computing devices store and communicate (internally and with other computing devices over a network) code and data using machine-readable media, such as machine storage media (e.g., magnetic disks; optical disks; random access memory; read only memory; flash memory devices; phase-change memory) and machine communication media (e.g., electrical, optical, acoustical or other form of propagated signals—such as carrier waves, infrared signals, digital signals, etc.). In addition, such computing devices typically include a set of one or more processors coupled to one or more other components, such as a storage device, one or more input/output devices (e.g., a keyboard, a touchscreen, and/or a display), and a network connection. The coupling of the set of processors and other components is typically through one or more busses and bridges (also termed as bus controllers). The storage device and signals carrying the network traffic respectively represent one or more machine storage media and machine communication media. Thus, the storage device of a given device typically stores code and/or data for execution on the set of one or more processors of that device. Of course, one or more parts of an embodiment of the invention may be implemented using different combinations of software, firmware, and/or hardware.

Figure 8:
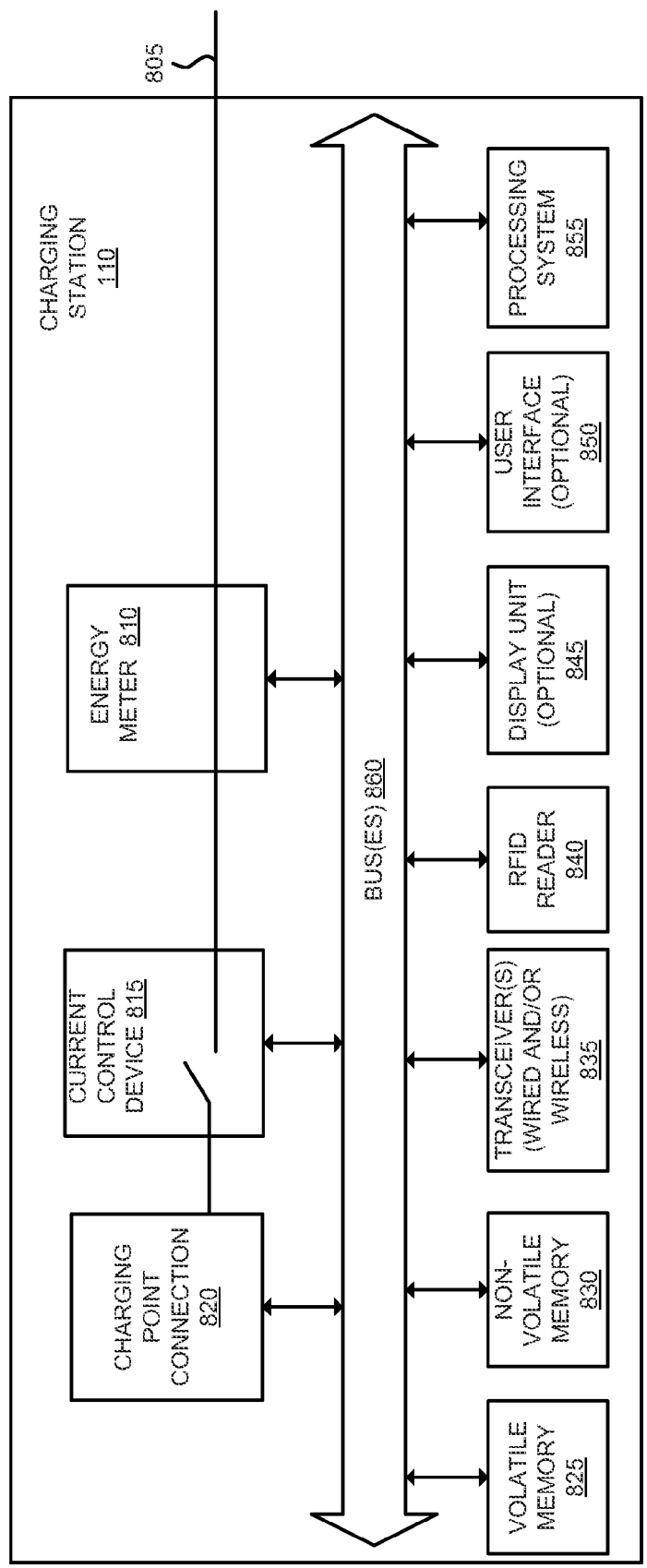
FIG. 8 is a block diagram illustrating an exemplary charging station according to one embodiment of the invention.

FIG. 8 illustrates an exemplary embodiment of the charging station 110 according to one embodiment of the invention. It should be understood that FIG. 8 illustrates an exemplary architecture of a charging station, and other, different architectures may be used in embodiments of the invention described herein.

As illustrated in FIG. 8, the charging station 110 includes the energy meter 810, the current control device 815, the charging point connection 820, the volatile memory 825, the non-volatile memory 830 (e.g., hard drive, flash, PCM, etc.), one or more transceiver(s) 835 (e.g., wired transceiver(s) (e.g., Ethernet, power line communication (PLC), etc.) and/or wireless transceiver(s) (e.g., 802.15.4 (e.g., ZigBee, etc.), Bluetooth, WiFi, Infrared, GPRS/GSM, CDMA, etc.)), the RFID reader 840, the display unit 845 (which is optional), the user interface 850 (which is optional), and the processing system 855 (e.g., one or more microprocessors and/or a system on an integrated circuit), which are coupled with one or more buses 860. With reference to FIG. 2, the epoch counter 240, the epoch length structure 245, and the event structure 250 are stored in the non-volatile memory 830.

The energy meter 810 measures the amount of electricity that is flowing on the power line 805 through the charging point connection 820. While in one embodiment of the invention the energy meter 810 measures current flow, in an alternative embodiment of the invention the energy meter 810 measures power draw. The energy meter 810 may be an induction coil or other devices suitable for measuring electricity.

The charging point connection 820 is a power receptacle or circuitry for an attached charging cord. The power receptacle can be any number of types of receptacles such as receptacles conforming to the NEMA (National Electrical Manufacturers Association) standards 5-1 5, 5-20, and 14-50 or other standards (e.g., BS 1363, CEE7, etc.) and may be operating at different voltages (e.g., 120V, 240V, 230V, etc.).

The current control device 815 is a solid-state device that is used to control the current flowing on the power line 805 or any other device suitable for controlling the current flowing on the power line 805. For example, in some embodiments the current control device 815 energizes the charging point connection 820 (e.g., by completing the circuit to the power line 805) or de-energizes the charging point connection 820 (e.g., by breaking the circuit to the power line 805). In some embodiments the current control device 815 energizes the charging point connection 820 responsive to receiving an authorized request from an electric vehicle operator.

The RFID reader 840 reads RFID tags from RFID enabled devices (e.g., smartcards, key fobs, etc.), embedded with RFID tag(s) of operators that want to use the charging station 110. For example, in some embodiments a vehicle operator can wave/swipe an RFID enabled device near the RFID reader 330 to request a charging session with the charging station 110.

The transceiver(s) 835 transmit and receive messages. For example, the transceiver(s) 835 transmit charging station events. The display unit 845, which is optional, is used to display messages to vehicle operators (e.g., charging status, confirmation messages, error messages, notification messages, etc.). The display unit 845 may also display parking information if the charging station 110 is also acting as a parking meter (e.g., amount of time remaining in minutes, parking violation, etc.). After receiving and synchronizing the local system clock 220 with real time, the display unit 845 may display the actual real time.

The user interface 850 (which is optional) allows users to interact with the charging station 110. By way of example, the user interface 850 allows electric vehicle operators to request charging sessions, pay for charging sessions, enter in account and/or payment information, etc.

The processing system 855 may retrieve instruction(s) from the volatile memory 825 and/or the nonvolatile memory 830, and execute the instructions to perform operations as described above.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the time server 170 is illustrated as being located remotely from the network server 160, in some embodiments the time server 170 is part of the network server 160. In other embodiments the real time clock 175 is part of the network server 160. In other embodiments, the real time clock 175 is part of the gateway 150 and provides actual real time to the charging stations 110, 120, 130, and 140.

In some embodiments, data integrity of the event communications is verified using a message integrity check algorithm. For example, a cryptographic hash function is applied to the data of an event communication at the charging station and the resulting data (sometimes referred to as a cryptographic checksum, digest, message code) is transmitted with the event communication. The server 160 performs the same cryptographic hash function to the data of the event communication and compares the resulting data (e.g., cryptographic checksum) with the data (e.g., cryptographic checksum) associated with that event communication. The authenticity of the event communication is verified if the data matches (e.g., if the cryptographic checksums match). The event communications may also be encrypted to prevent the data from being seen by unauthorized parties.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed in an electric vehicle charging station for time synchronization with a Real Time Clock, wherein the electric vehicle charging station does not include a battery-backed Real Time Clock, the method comprising:
   responsive to booting of the electric vehicle charging station, incrementing a value of an epoch counter which indicates the number of times the electric vehicle charging station has booted, wherein the incremented value indicates the current epoch, and wherein the booting of the electric vehicle charging system creates a boot-up event;
   beginning a local system clock, wherein the local system clock is not backed up with a battery and will restart once power is lost to the electric vehicle charging station;
   recording the time of the boot-up event for the current epoch in local system time format, wherein local system time format is not in real time format;
   requesting real time from one of a charging station network server and a charging station network gateway;
   responsive to failing to receive the requested real time, performing the following:
      for each event that occurs on the electric vehicle charging station, including charging session start events and charging session stop events, recording the time of that event in local system time format for the current epoch; and
   responsive to receiving the requested real time, performing the following:
      recording the time of receipt of the requested real time in local system time format,
      synchronizing the local system clock to the real time,
      converting the time of each event recorded in local system time format to real time format, and
      communicating each event and its respective time of occurrence in real time format to the charging station network server.

2. The method of claim 1, wherein converting the time of each event recorded in local system time format to real time format comprises:
   determining the real time that the current epoch started;
   for each event recorded during the current epoch, setting the real time of that event as the sum of the local system time value of that event and the real time that the current epoch started.

3. The method of claim 2, further comprising periodically recording a length of the current epoch.

4. The method of claim 3, wherein converting the time of each event recorded in local system time format to real time format further comprises:
   determining that there is one or more previous epochs with events recorded in local system time format; and
   for each of these previous epochs, performing the following:
      determining a recorded length of that previous epoch, wherein the value of that epoch length is an approximate amount of time the electric vehicle charging station operated during that epoch;

determining an approximate real time that the epoch started based on the determined epoch length, wherein the approximate real time that the epoch started corresponds with a boot-up event of that epoch, and for each event recorded during that epoch, setting the real time of the event as the sum of the local system time value of that event and the approximate real time that the epoch started.

5. The method of claim 4, wherein determining the approximate real time that the previous epoch started comprises:

determining the real time of the boot-up event of the current epoch;

identifying the length of the previous epoch and the length of any other epochs between the previous epoch and the current epoch; and setting the approximate real time of the boot-up event of the previous epoch as the difference between the length of the previous epoch and the length of any other epochs between the previous epoch and the current epoch and the real time of the boot-up event of the current epoch.

6. The method of claim 5, wherein determining the approximate real time that the epoch started also takes into an account an approximate amount of time to boot-up the electric vehicle charging station.

7. The method of claim 1, wherein the events also include one or more of the following: ground fault circuit interrupt (GFCI) events, overcurrent events, charging plug out events, authentication events, and tampering events.

8. An electric vehicle charging station to synchronize a local system clock with a Real Time Clock, comprising:

an event manager to record time of events according to the local system clock, wherein the local system clock is not backed up with a battery, wherein the event manager is to record events in local system time format when the local system clock is not synchronized with real time, and record events in real time format when the local system clock is synchronized with real time, and wherein the events include charging session start events and charging session stop events; and a time synchronization module to perform the following:

increment a value of an epoch counter of the charging station responsive to the charging station booting, wherein the incremented value indicates a current epoch and represents the number of times the electric vehicle charging station has booted, periodically record a length of the current epoch, request real time after the charging station boots, synchronize the local system clock with received real time, and convert times of events recorded in local system time format to real time format responsive to the local system clock being synchronized with real time.

9. The electric vehicle charging station of claim 8, wherein the time synchronization module is to convert times of events recorded in local system time format to real time format from previous epochs taking into account the lengths of those previous epochs.

10. The electric vehicle charging station of claim 9, wherein the conversion of events recorded in local system time format to real time format from previous epochs also takes into account an approximate amount of time to boot the electric vehicle charging station.

11. The electric vehicle charging station of claim 8, wherein the events include charging session start events and charging session stop events.

12. The electric vehicle charging station of claim 11, wherein the events further include one or more of ground fault circuit interrupt (GFCI) events, overcurrent events, charging plug out events, authentication events, and tampering events.

13. A machine-readable storage medium that provides instructions that, if executed by a processor, will cause said processor to perform operations in an electric vehicle charging station for time synchronization with a Real Time Clock, wherein the electric vehicle charging station does not include a battery-backed Real Time Clock, the operations comprising:

responsive to booting of the electric vehicle charging station, incrementing a value of an epoch counter which indicates the number of times the electric vehicle charging station has booted, wherein the incremented value indicates the current epoch, and wherein the booting of the electric vehicle charging system creates a boot-up event;

beginning a local system clock, wherein the local system clock is not backed up with a battery and will restart once power is lost to the electric vehicle charging station;

recording the time of the boot-up event for the current epoch in local system time format, wherein local system time format is not in real time format;

requesting real time from one of a charging station network server and a charging station network gateway;

responsive to failing to receive the requested real time, performing the following:

for each event that occurs on the electric vehicle charging station, including charging session start events and charging session stop events, recording the time of that event in local system time format for the current epoch; and responsive to receiving the requested real time, performing the following:

recording the time of receipt of the requested real time in local system time format, synchronizing the local system clock to the real time, converting the time of each event recorded in local system time format to real time format, and communicating each event and its respective time of occurrence in real time format to the charging station network server.

14. The machine-readable storage medium of claim 13, wherein converting the time of each event recorded in local system time format to real time format comprises:

determining the real time that the current epoch started;

for each event recorded during the current epoch, setting the real time of that event as the sum of the local system time value of that event and the real time that the current epoch started.

15. The machine-readable storage medium of claim 14, further comprising periodically recording a length of the current epoch.

16. The machine-readable storage medium of claim 15, wherein converting the time of each event recorded in local system time format to real time format further comprises:

determining that there is one or more previous epochs with events recorded in local system time format; and for each of these previous epochs, performing the following:

determining a recorded length of that previous epoch, wherein the value of that epoch length is an approximate amount of time the electric vehicle charging station operated during that epoch;

determining an approximate real time that the epoch started based on the determined epoch length, wherein the approximate real time that the epoch started corresponds with a boot-up event of that epoch, and for each event recorded during that epoch, setting the real time of the event as the sum of the local system time value of that event and the approximate real time that the epoch started.

17. The machine-readable storage medium of claim 16, wherein determining the approximate real time that the previous epoch started comprises:

determining the real time of the boot-up event of the current epoch;

identifying the length of the previous epoch and the length of any other epochs between the previous epoch and the current epoch; and setting the approximate real time of the boot-up event of the previous epoch as the difference between the length of the previous epoch and the length of any other epochs between the previous epoch and the current epoch and the real time of the boot-up event of the current epoch.

18. The machine-readable storage medium of claim 17, wherein determining the approximate real time that the epoch started also takes into an account an approximate amount of time to boot-up the electric vehicle charging station.

19. The machine-readable storage medium of claim 13, wherein the events also include one or more of the following: ground fault circuit interrupt (GFCI) events, overcurrent events, charging plug out events, authentication events, and tampering events.

20. A method performed in an electric vehicle charging station for time synchronization with a Real Time Clock, wherein the electric vehicle charging station does not include a battery-backed Real Time Clock, the method comprising:

responsive to booting of the electric vehicle charging station, incrementing a value of an epoch counter which indicates the number of times the electric vehicle charging station has booted, wherein the incremented value indicates the present epoch, and wherein the booting of the electric vehicle charging system creates a boot-up event;

beginning a local system clock, wherein the local system clock is not backed up with a battery and will restart once power is lost to the electric vehicle charging station;

determining a locally estimated real time value that the present epoch started, wherein the locally estimated real time value is not based on actual real time, and wherein the locally estimated real time value is in a format that is persistent across reboots of the electric vehicle charging station;

setting the local system clock to the determined locally estimated real time value the present epoch started;

recording the boot-up event for the current epoch with a locally estimated real time value using the local system clock;

requesting actual real time from one of a charging station network server and a charging station network gateway; and while the requested actual real time is not received and the communication between one of the charging station network server and the charging station network gateway is operable, performing the following for each event that occurs on the electric vehicle charging station:

recording that event with a locally estimated real time value using the local system clock, and communicating that event with its locally estimated real time value to the charging station network server.

21. The method of claim 20, further comprising:
responsive to receiving the actual real time, performing the following:

synchronizing the local system clock to the actual real time, recording each event subsequently occurring in actual real time, and communicating each event recorded in actual real time to the charging station network server.

22. The method of claim 20, further comprising:
periodically recording a length of the current epoch; and
wherein the locally estimated real time value that present epoch started is the sum of the start of the immediately previous epoch of the present epoch and a length of the immediately previous epoch.

* * * * *